United States Patent [19]
Godfrey

[11] Patent Number: 5,709,113
[45] Date of Patent: Jan. 20, 1998

[54] SELF-STORING SECURITY DEVICE

[75] Inventor: Rex A. Godfrey, Akron, Ohio

[73] Assignee: Winner International Royalty Corporation, Sharon, Pa.

[21] Appl. No.: 618,925

[22] Filed: Mar. 20, 1996

[51] Int. Cl.⁶ ............................................. E05B 71/00
[52] U.S. Cl. .................................... 70/233; 70/227
[58] Field of Search ......................... 211/4, 5, 17–24; 70/14, 18, 19, 58, 62, 225–227, 233–235

[56] References Cited

U.S. PATENT DOCUMENTS

| | | | |
|---|---|---|---|
| 533,755 | 2/1895 | Taylor | 70/226 |
| 601,856 | 4/1898 | McDonald | 70/226 |
| 1,218,540 | 3/1917 | Fell | 70/226 |
| 1,402,725 | 1/1922 | Pippen | 70/227 |
| 1,654,017 | 12/1927 | Schlener | 70/227 |
| 2,366,863 | 1/1945 | Lippon | 70/227 |
| 3,922,894 | 12/1975 | Johnson | 70/18 |
| 3,965,709 | 6/1976 | Belke | 70/227 |
| 4,188,808 | 2/1980 | Valdez | 70/227 X |
| 4,271,690 | 6/1981 | Jaulmes | 70/227 X |
| 4,436,232 | 3/1984 | Zane et al. | 224/39 |
| 4,571,965 | 2/1986 | Leroux | 70/233 X |
| 4,736,921 | 4/1988 | Zane et al. | 248/316.2 |
| 4,773,239 | 9/1988 | Lowe et al. | 70/38 |
| 4,945,739 | 8/1990 | Prindle | 70/227 X |
| 4,966,382 | 10/1990 | Giles | 280/288.4 |
| 5,069,049 | 12/1991 | Shieh | 70/227 |
| 5,076,526 | 12/1991 | Zane et al. | 248/314 |
| 5,127,562 | 7/1992 | Zane et al. | 224/39 |
| 5,133,568 | 7/1992 | Balterman | 280/288.4 |
| 5,138,901 | 8/1992 | Dabandjian et al. | 74/551.8 |
| 5,157,954 | 10/1992 | Pietras | 70/227 |
| 5,167,353 | 12/1992 | Hughes | 224/39 |
| 5,226,341 | 7/1993 | Shores | 74/551.8 |
| 5,291,765 | 3/1994 | Hoisington | 70/18 X |
| 5,408,212 | 4/1995 | Meyers et al. | 70/233 X |

FOREIGN PATENT DOCUMENTS

| | | | |
|---|---|---|---|
| 430352 | 4/1925 | Germany | 70/227 |
| 22427 | 11/1895 | United Kingdom | 70/226 |
| 563566 | 8/1944 | United Kingdom | 70/227 |
| 2239635 | 7/1991 | United Kingdom | 70/14 |

OTHER PUBLICATIONS

THE BOLT—Promotional material.
Post Lock Carrier (D)—from catalog page.

*Primary Examiner*—Suzanne Dino
*Attorney, Agent, or Firm*—Vickers, Daniels & Young

[57] ABSTRACT

A bicycle security device comprises a receiver which is adapted to be mounted to the frame of a bicycle and a U or J-shaped shackle. In the locked position, the shackle engages a locking mechanism in the receiver to secure the bicycle to an immoveable object or alternatively to secure the wheel of the bicycle to the frame. In the stored position, the shackle is held in the receiver to avoid contact with the bicycle rider. The locking mechanism preferably comprises a pawl-ratchet arrangement or a lock pin adapted to engage one of a plurality of semi-circular grooves along one arm of the shackle.

14 Claims, 10 Drawing Sheets

SELF-STORING SECURITY DEVICE

FIELD OF THE INVENTION

This invention relates to a self-contained security device, more particularly, a theft-prevention device for use on bicycles, motorcycles, mopeds, and other conveyances. Yet more particularly, the invention relates to a lockable device useful for coupling a two or three wheeled conveyance to a fixed object such as a pole or bike rack, or for securing a wheel of a bicycle to the bike frame to insure safety from theft. The device is mounted to the bicycle or other conveyance, and is self-storing when not in use.

BACKGROUND OF THE INVENTION

Bicycles have been used as a means of transportation for hundreds of years. In certain countries, they serve as a mode of transportation which rivals or exceeds cars in popularity and practicality.

With the growth in popularity of bicycles, they have increasingly become the target of random as well as organized theft. Along with the increase in the rate of theft of these bicycles, various theft deterrent devices have been developed ranging in complexity from simple immobilizers and chain padlock combinations to sophisticated, expensive, electronic warning devices.

A number of strong bicycle lock devices are presently on the market. However, many of these devices lack a convenient means for storing the device when not in use. Commonly, such devices are carried by the rider or by a separate holder mounted on the bicycle. In the case of chain padlocks, the device is commonly stored by wrapping the chain around the frame, the seat, or the handlebars. This creates a definite nuisance and, in some instances, a hazard particularly if the ends of the chain are allowed to hang down in the proximity to the spokes of the wheel. Other types of locking devices can be retrofitted for storage on the bicycle when not in use. Commonly, however, many of these bicycle locks lack the adjustability and versatility to accommodate different types and sizes of bicycles and locking arrangements.

SUMMARY OF THE INVENTION

In one embodiment, the invention relates to a combination of a bicycle and a locking device, the bicycle including a frame and front and rear wheels, and the locking device including a shackle and a receiver. The receiver is secured to a portion of the frame such as a tubular member and includes a locking mechanism. The shackle is generally U-shaped and comprises first and second parallel arms joined by a bight. The shackle engages the receiver in a first position for securing or locking the bicycle and a second position for storing the shackle when not in use. The locking mechanism cooperates with the shackle to secure the shackle to the receiver in the locked position. The device may also include means for securing the shackle to the receiver in the stored position. When the shackle is in the locked position, the arms of the shackle are generally perpendicular to the portion of the frame to which the receiver is attached. Typically, the bicycle includes a seat, handlebars, two wheels, and a frame. The frame includes an axially elongated seat tube extending between the bottom bracket holding the chain sprocket and the seat. A down tube extends axially from the head tube, to which the handlebars are attached, to the bottom bracket.

The receiver may be mounted on the seat tube which extends axially between the seat and the bottom bracket. This installation permits the device to secure the bicycle and rear wheel to an immovable object such as a bike rack or a fence post. The receiver comprises a unitary body which preferably includes a hinged clamp which permits the receiver to be mounted on the down tube, using fastening means such as bolts threaded into the body. The receiver may include an extension arm which extends from the body rearwardly of said bicycle frame, terminating in a free end. The extension arm is offset with respect to the seat tube and extends rearwardly beyond the tire and rim. Near the free end of the extension arm is a hole. The hole is in axial alignment with a hole through the receiver which engages the locking mechanism, thereby permitting the first arm of the shackle to engage the locking mechanism while the second arm engages the hole in the free end of the extension arm. The distance between the two holes corresponds to the spacing between the two arms of the shackle. With the receiver mounted on the axially extending seat tube, these two holes are at right angles to the axis of the seat tube and serve to hold the shackle in the locked position with the shackle arms generally perpendicular to the seat tube. The use of the extension arm provides additional support for the free-end of the shackle when locked. However, the lock without the extension arm also serves to secure the bicycle to an immovable post.

The locking mechanism useful with the present device may comprise a pawl and ratchet arrangement, actuated by a key lock or combination lock. With this arrangement, the ratchet teeth are evenly spaced along at least a portion of the length of the first arm of the shackle. The teeth may completely circumscribe the arm or may be aligned along the inside, the outside or one of the lateral surfaces of the shackle arm. Alternatively, the locking arrangement may involve the use of a series of semicircular grooves along the first arm of the shackle, partially or fully circumscribing the same, said grooves engaging a key actuated locking pin within the receiver. The locking pin typically is semicircular in shape and is mounted within the receiver so that the semicircular portion of the pin engages one of the semicircular grooves to prevent axial movement of the shackle arm within the receiver in the locked position. In the unlocked position, the pin is rotated 180° so that its flat surface permits uninterrupted axial movement of the shackle arm within the receiver.

The body of the receiver includes a second hole parallel to the axis of the seat tube for storage of the shackle when not in use. The storage hole may contain a spring biased bearing engaging a recess in an arm, preferably the second arm, of the shackle to arrest movement of the arm in the receiver during storage. Furthermore, the cross sectional shape of the arm and said storage hole preferably will prevent rotation of the shackle arm in the receiver. Thus, the cross section of the hole and the arm may be angular, preferably square, rather than circular to prevent rotation. Alternatively, the hole and arm may be provided with a key-slot or may be less than fully circular, with a flattened portion, to thereby arrest rotational movement of the arm in the receiver. When the shackle is stored in the body of the receiver, the shackle arms generally are parallel to the seat tube axis. When the receiver includes an extension arm, another alternative for storage of the shackle when not in use is to provide a second hole through the extension arm near the free-end thereof. This second hole receives one arm of the shackle as the other shackle arm engages the storage hole in the body of the receiver. Instead of using a second hole near the end of the extension arm, the extension arm can be coupled to the receiver body in such a manner as to permit axial rotation of the arm 90° to align the hole with the lock hole or with the storage hole in the receiver body as needed.

A modified version of the device may be used to secure the front wheel of the bicycle to the frame. This device, which is particularly useful with bicycles having quick release hubs on the front wheels, includes a receiver which is clamped or otherwise secured to the down tube of the bicycle. The receiver is mounted in proximity to the front wheel of the bicycle. The receiver includes a pair of holes or slots to receive the U-shaped shackle when said shackle is placed around the wheel rim and tire with the arms of the shackle inserted into said slots or holes at right angles to the axis of the down tube. Again, the locking mechanism of the device comprises a key actuated or combination lock, and a pawl and ratchet arrangement, or semicircular grooves on one or both arms of the U-shaped shackle to engage the locking mechanism. In addition to storing the shackle, the receiver may include lock means for securing the shackle against unauthorized removal during storage.

In another embodiment, the invention comprises a combination bicycle lock and storage device, including a receiver adapted to be mounted on and secured to a portion of the bicycle frame in proximity to a front or rear wheel of the bicycle, said receiver including locking means and storage means, and a U-shaped shackle including lock engaging means. When the receiver is adapted to be mounted to the seat tube of the bicycle for securing the bicycle frame and rear wheel to an immovable object, the receiver may include an extension arm which, when the receiver is mounted to the seat tube, is offset with respect to said seat tube. Said extension arm is adapted to extend toward the rear of the bicycle and to terminate in a free end when the receiver is so mounted. The extension arm includes a hole near the free end of the arm.

The shackle is U-shaped having first and second parallel arms joined by a bight. At least one of the parallel arms includes lock engaging means. The shackle cooperates with the locking means of the receiver in a first position to secure a bicycle or a component thereof, and cooperates with the storage means of the receiver in a second position to store the shackle when not in use. The lock engaging means is spaced from the hole in the end of the extension arm a distance equal to the distance between the two parallel arms of the shackle. This permits the first of the shackle arms to engage the locking means and the second of said arms to engage the hole in the free end of the extension arm whereby said shackle is in locking engagement with said receiver. The cross sectional shape of the second arm corresponds to the cross sectional shape of the hole in the receiver for storage of the shackle whereby rotation of the shackle in the receiver during storage is precluded. The hole in the end of the extension arm likewise corresponds with the cross sectional shape of the second arm of the receiver. Thus, the holes and the cross sectional shape of the second arm may be triangular, rectangular or square. Alternatively, they may be semicircular or may be provided with a key-slot arrangement to preclude said rotation. The extension arm may include a second hole parallel to the receiver storage hole and spaced therefrom a distance equal to the spring between the shackle arms, whereupon both arms of the shackle are supported by the receiver during storage.

As previously stated, the lock engaging means on the first shackle arm may comprise ratchet teeth evenly spaced along at least a portion of said arm, with the locking means within the receiver including a spring biased pawl for engaging said teeth. The teeth and the pawl cooperate to permit insertion of the first arm into the locking means but to prevent withdrawal of the arm from the locking means when the locking mechanism is in a locked position.

By arranging the teeth at an angle of 45° with respect to the axis of the shackle arm, the device secures the shackle to the receiver in either the locked position or the stored position. Typically, each of the teeth comprises an abutment surface and a bearing surface. The receiver includes two passageways which intersect one another at right angles to form a common opening. The spring biased pawl is positioned to engage the teeth abutment surface when the shackle arm is in the locked position or in the stored position in the receiver. By moving the pawl out of engagement with the ratchet teeth, the arm moves freely into and out of either passageway. The pawl has a shape in cross-section of an ellipse having a major and a minor axis. It intersects the common passageway in the receiver with each axis of the ellipse forming a 45° angle with respect to the axial direction of each of the passageways. Correspondingly, each pawl axis is 45° with respect to the axis of the shackle arm in the stored position or the locked position.

Instead of a pawl and ratchet arrangement, the locking means may comprise semicircular grooves evenly spaced along the first shackle arm with the locking means including a lock pin adapted to rotate into and out of engagement with the grooves to prevent or alternatively to permit movement of the first arm into and out of the receiver.

When the device is adapted to be used for securing the front wheel of a bicycle to the frame, the receiver is positioned on the down tube to receive the shackle in a first locked position as the shackle passes around said front wheel. The device further permits storage of the shackle with the receiver.

The use of an extension arm projecting rearwardly from the receiver provides enhanced support for both ends of the V-shaped shackle when locked. A further option is to support and secure only one arm to the receiver, the unsupported second arm and the bight passing around a secure object and the bicycle wheel. To facilitate the engagement of the shackle with the object, the second arm typically is shorter than the first. The device typically is provided either with ratchet teeth or semi-circular grooves along the first arm. The teeth or grooves are evenly spaced along the at least a portion of the arm, partially or fully circumscribing the arm. Furthermore, when using ratchet teeth, they may be provided along one side of the arm thereby forming a generally planar plateau between each abutment surface and the next adjacent bearing surface.

In yet another embodiment of the present invention, a receiver is adapted to be used with a shackle to secure a bicycle or the like to a fixed object. The receiver comprises a body adapted to be attached to the frame of a bicycle, said body including:

a) means for attaching the body to a bicycle frame;

b) a locking mechanism;

c) means to receive a shackle in a first position in which the shackle is adapted to engage said locking mechanism to permit a bicycle component to be secured against theft; and d) means to receive a shackle in a second position for storage of the shackle when not in use.

The body of the receiver is adapted to be clamped to a portion of the bicycle such as a seat tube or a down tube. The body contains a first hole adapted to receive the shackle in a first position in engagement with the locking mechanism and a second hole adapted to receive the shackle in a second position for storage. The receiver is adapted to be used with a generally U-shaped shackle having two parallel arms. The locking mechanism is actuatable between a locked and an unlocked mode. When in the locked mode, the mechanism includes locking means adapted to prevent removal of the shackle from the body.

The receiver, when it is adapted to be used on the seat tube of a bicycle, may include an extension arm having a free end containing a hole therethrough, said hole adapted to receive the second arm of a U-shaped shackle when the shackle is in the first locked position, said extension arm being offset with respect to the frame of the bicycle to which the receiver is adapted to be secured. When so mounted, the free end of the extension arm extends rearwardly beyond the rim of the rear wheel of the bicycle. The locking mechanism comprises a key operated pawl adapted to alternately engage and disengage ratchet teeth on one arm of the U-shaped shackle. Alternatively, the locking mechanism comprises a key operated means adapted to alternately engage and disengage semicircular grooves spaced along one arm of the U-shaped shackle.

It is an object of the present invention to provide a theft deterrent device for bicycles and other two and three-wheeled conveyances.

Another objective of the present invention is a bicycle lock which becomes an integral part of the bicycle.

Yet another objective of the present invention is to eliminate the problem of storage of the bicycle lock when not in use.

Yet another objective is a theft deterrent device comprising a U-shaped shackle which connects to a receiver mounted to a bicycle frame to lock the bicycle or alternatively to store the shackle on the receiver when the device is not in use.

DETAILED DESCRIPTION OF THE INVENTION

Figure 1A:
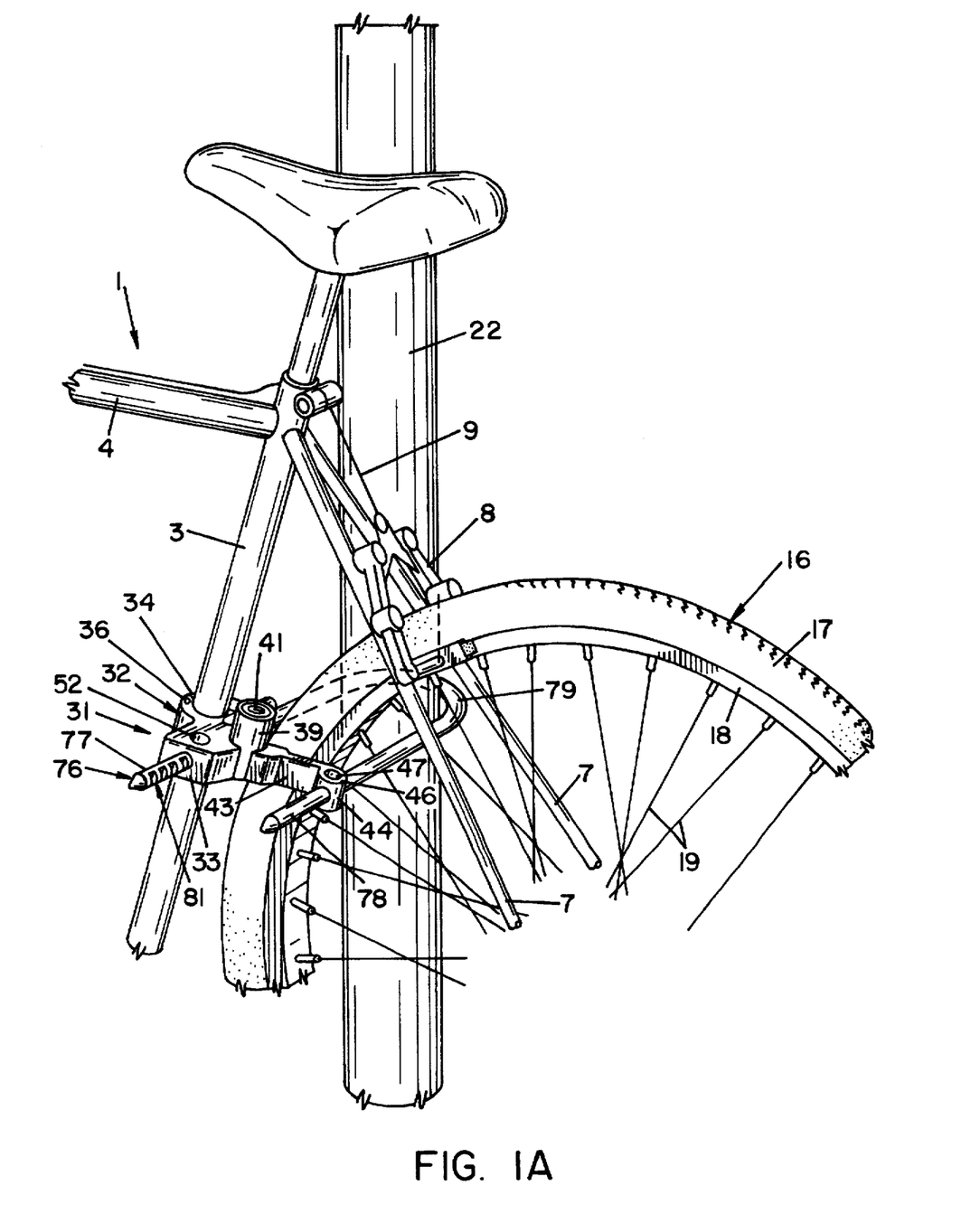
FIG. 1A is a partial view in perspective of a bicycle showing a first lock device to secure the bicycle frame and rear wheel to an immoveable object.
Figure 1B:
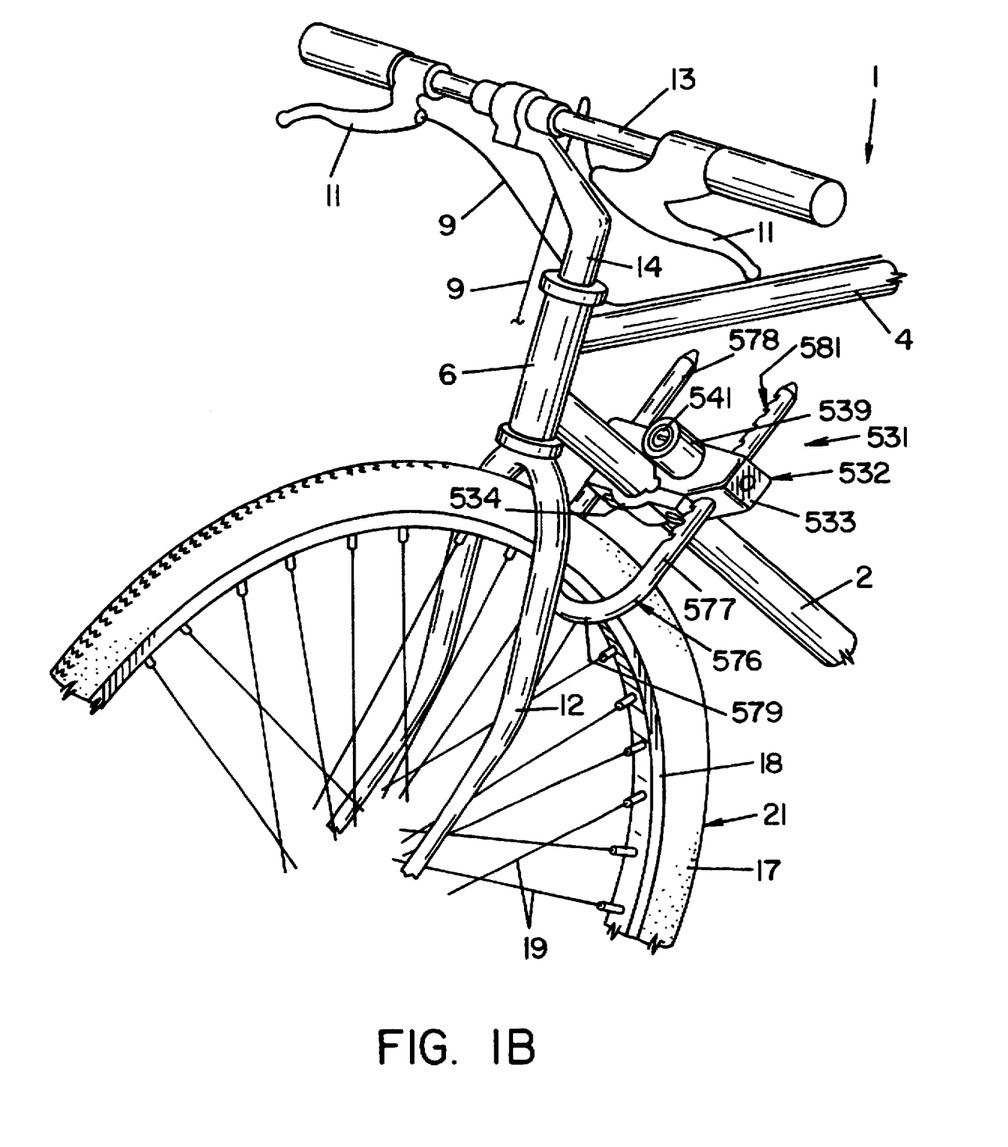
FIG. 1B is a perspective view of the lock device used to secure the front wheel to the frame of the bicycle.

Referring now to the drawings and particularly FIGS. 1A, 1B, 2–4, FIG. 1A shows in perspective the rear portion of a two wheel bicycle 1 and FIG. 1B shows the front portion of the bicycle. The bicycle comprises a frame including a down tube 2, a seat tube 3 and a top tube 4 joined together generally in the form of a rigid triangle. A rear wheel 16 including tire 17, rim 18 and spokes 19, is positioned between the two forks of seat stays 7 and the chain stay (not shown). Caliper brakes 8 are mounted on seat stays 7 and are connected to a cable 9 which attaches to a brake lever 11 (shown in FIG. 1B) to permit the rider to arrest the rotation of the wheel 16 thereby stopping the bicycle.

In FIG. 1B, the front wheel 21, comprising tire 17, rim 18, and spokes 19, is mounted on the front fork 12. Caliper brakes (not shown) are connected by brake cable 9 to brake lever 11 mounted on handle bars 13 joined to handlebar stem 14. The bike frame includes a head tube 6, down tube 2 extending from the head tube, and top tube or crossbar 4 joining the head tube to the seat tube 3.

A first security device is shown in FIG. 1A, serving to secure the bicycle to as stationary object 22 such as a bicycle rack, fence post or the like. A front lock is shown in FIG. 1B securing the front wheel 21 to the down tube 2. This second lock is particularly useful when the bike is equipped with a quick release lever for the front wheel to permit rapid disengagement of the wheel from the front fork. Notwithstanding the fast acting feature of the quick release lever, the wheel cannot be separated from the frame of the bicycle when secured thereto by the second lock.

Referring now to FIGS. 1A, 2, 3, 3A and 4, a security device 31 useful for locking the frame and the rear wheel of a bicycle to an immoveable object 22 is shown mounted to the seat tube 3 of a bicycle. The device comprises a receiver 32 and a U-shaped shackle 76. The receiver comprises a receiver body 33 secured to the seat tube 3 by clamp 34 pivotally joined to the receiver body by hinge 36. A protective pad 37 is used between the clamp and the seat tube to prevent metal to metal contact between the device and the bicycle frame. The clamp is secured in place using suitable means such as bolts 38 threaded into the body 33 of the receiver. Joined to the receiver body 33 is a boss 39 containing a lock cylinder 41. Key 42 is used to actuate the lock within the lock cylinder.

Figure 2:
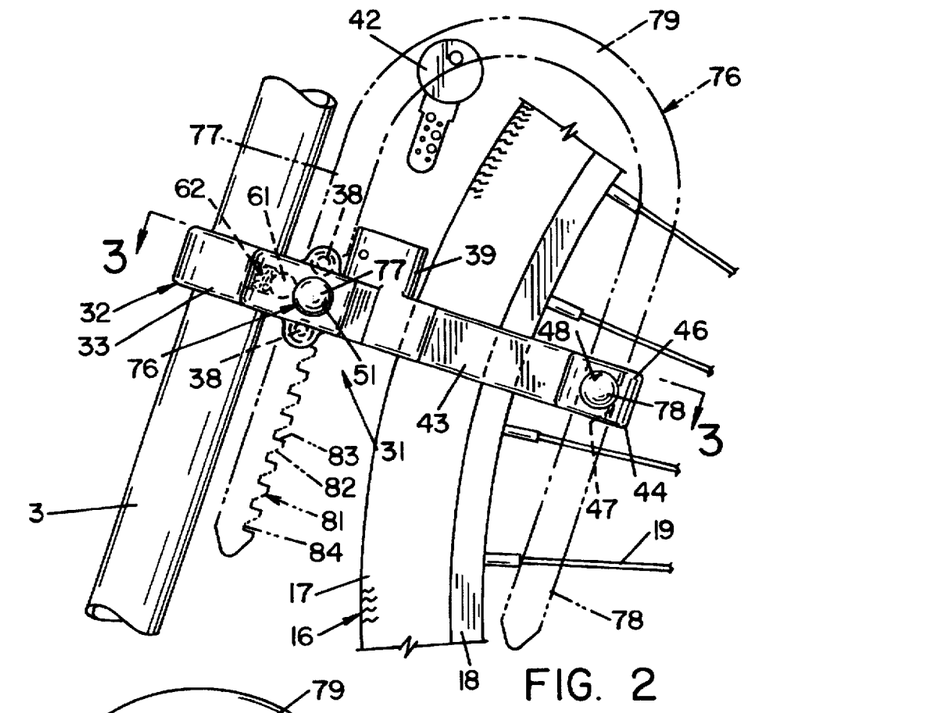
FIG. 2 is an elevational view of one embodiment of a locking device, partially in cross-section, useful for securing the rear wheel and frame of a bicycle to an object.
Figure 3:
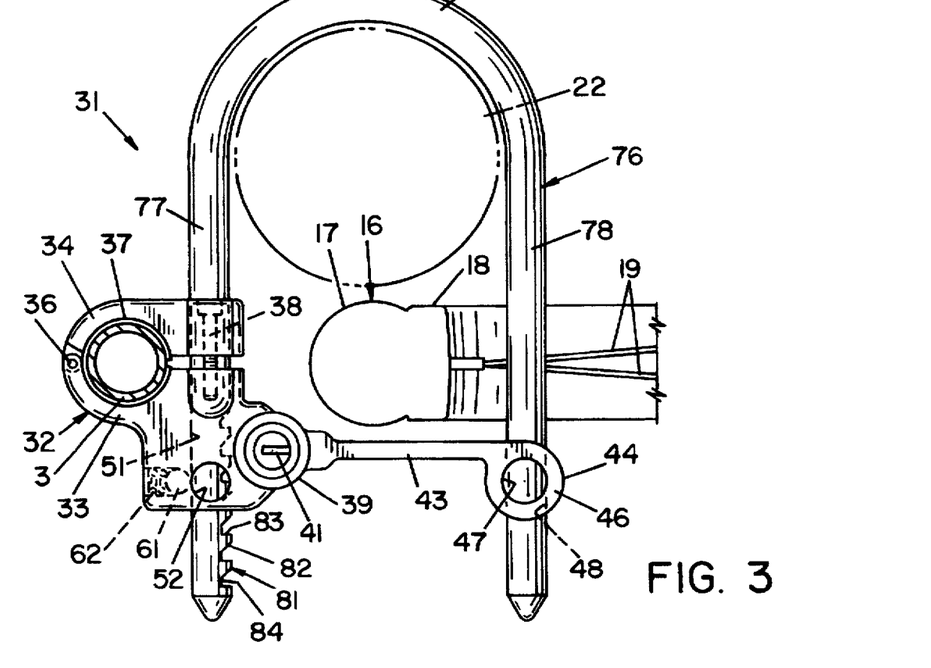
FIG. 3 is a plan view taken along lines 3—3 of FIG. 2, partially in cross-section.
Figure 4:
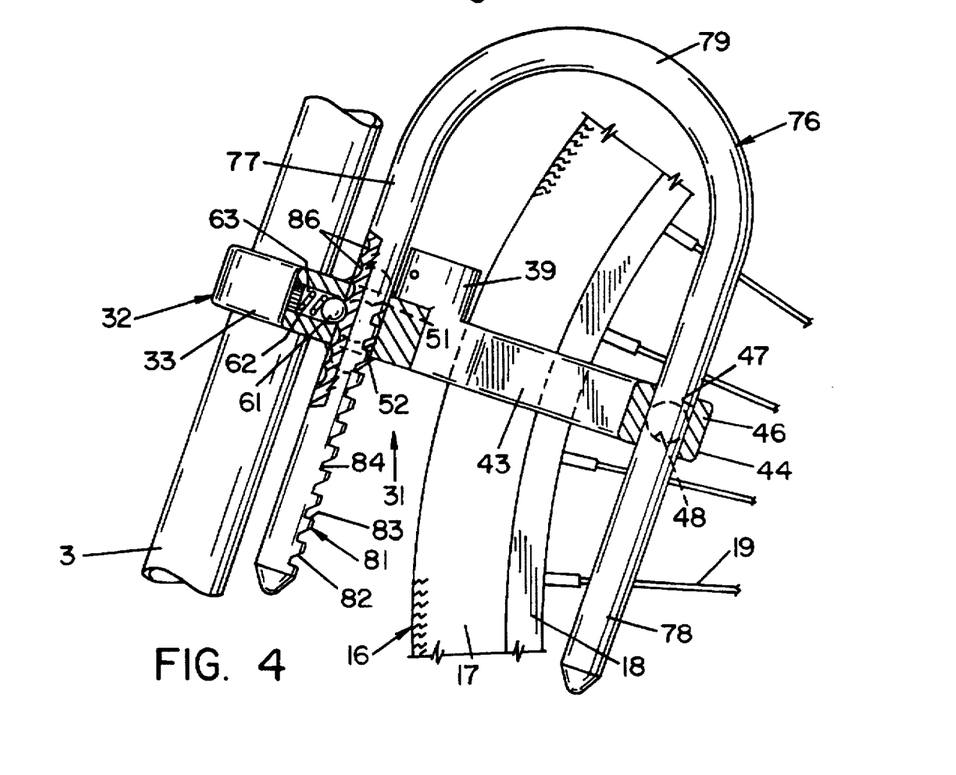
FIG. 4 is an elevational view partially in cross-section showing the lock of FIGS. 2 and 3 with the shackle in the stored position.

Extending rearwardly beyond the rim 18 and tire 17 of the back wheel 16 is extension arm 43 terminating in free end 44. The extension arm is offset with respect to the axis of the seat tube 3 thereby avoiding contact with the rear wheel 16. The free end 44 of the arm forms a cylindrical tube 46 with an axial hole 47 therethrough to receive one arm of the shackle when not in use. A hole 48 orthogonal to the axis of the tube 46 is used to hold the shackle arm when the device is in the locked mode.

Figure 3A:
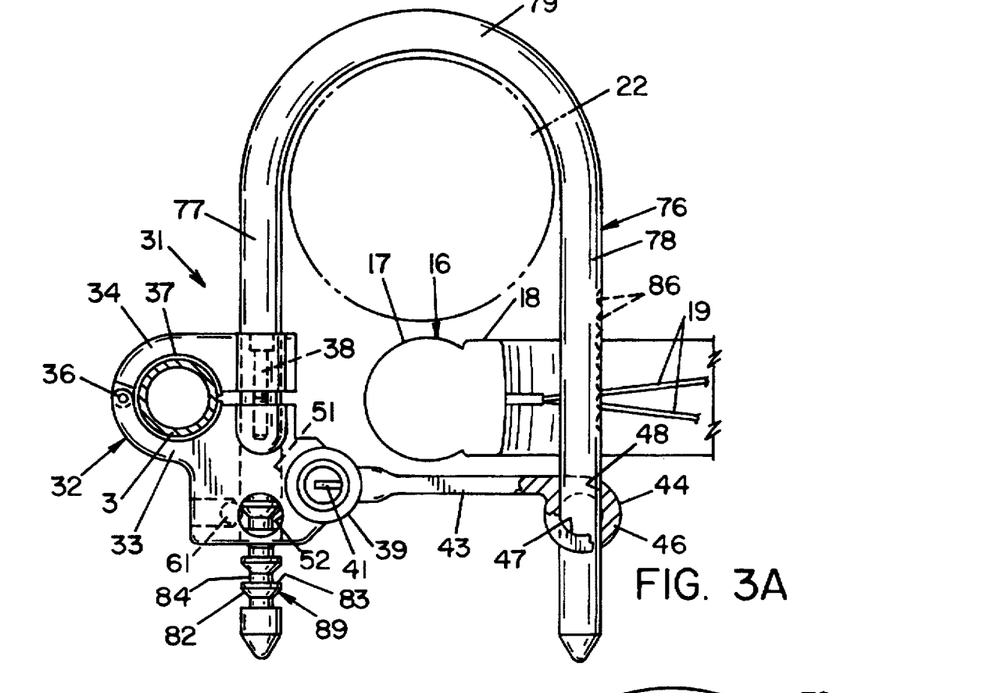
FIG. 3A is a fragmentary plan view showing a shackle with fully circumscribing ratchet teeth.

The shackle 76 comprises a first shackle arm 77 and a second shackle arm 78 joined together by bight 79. The two arms are parallel to one another. Portions of the arms and bight are preferably coated with a plastisol coating for environmental protection, and to minimize metal to metal contact between the shackle and the bicycle frame. The first arm is provided with ratchet teeth 81 which are flat (FIG. 3) or teeth 89 which partially or fully circumscribe the arm (FIG. 3A). The lock utilizes a pawl (not shown), spring biased into contact with the ratchet teeth. Each ratchet tooth 81 or 89 includes a sloped bearing surface 82 an abutment surface 83 and, optionally, a flat or cylindrically shaped surface 84 joining the abutment surface of one tooth to the bearing surface of the next adjacent tooth. The ratchet teeth and the pawl cooperate to permit the shackle to be inserted into lock hole 51 of the receiver, but to resist removal of the shackle from the receiver when the device is locked. Unlocking of the device permits free movement of the shackle into or out of the receiver.

When there is no need to secure the bicycle against theft or unauthorized use, the shackle 76 is stored as shown in FIG. 4 with one arm of the shackle (shown as the arm 77 containing the ratchet teeth), inserted in storage hole 52 in the body 33 of the receiver 32 and the other arm inserted in storage hole 47 near the end 44 of extension arm 43. FIG. 4 shows a series of detents 86 arranged along the outside surface of shackle arm 77. These detents engage a circular bearing 61 biased by by a coil spring 62 in blind hole 63. The compressive resistance of the spring is sufficient to hold the shackle 76 against axial movement within the storage hole 52 in the receiver body 33 while permitting axial movement of the shackle to the desired storage position within the receiver.

In the remaining figures, the last two digits of the part numbers are used to refer to similar parts of the security device.

Turning now to FIGS. 5–9, shown is a device of the present invention which utilizes one key operated lock to prevent withdrawal of the shackle from the receiver in either the secured or the stored positions. As before, the device is used to secure the bicycle seat tube 3 and rear wheel 16 to an immoveable object 22 to prevent theft of the bicycle.

Figures 5, 7A:
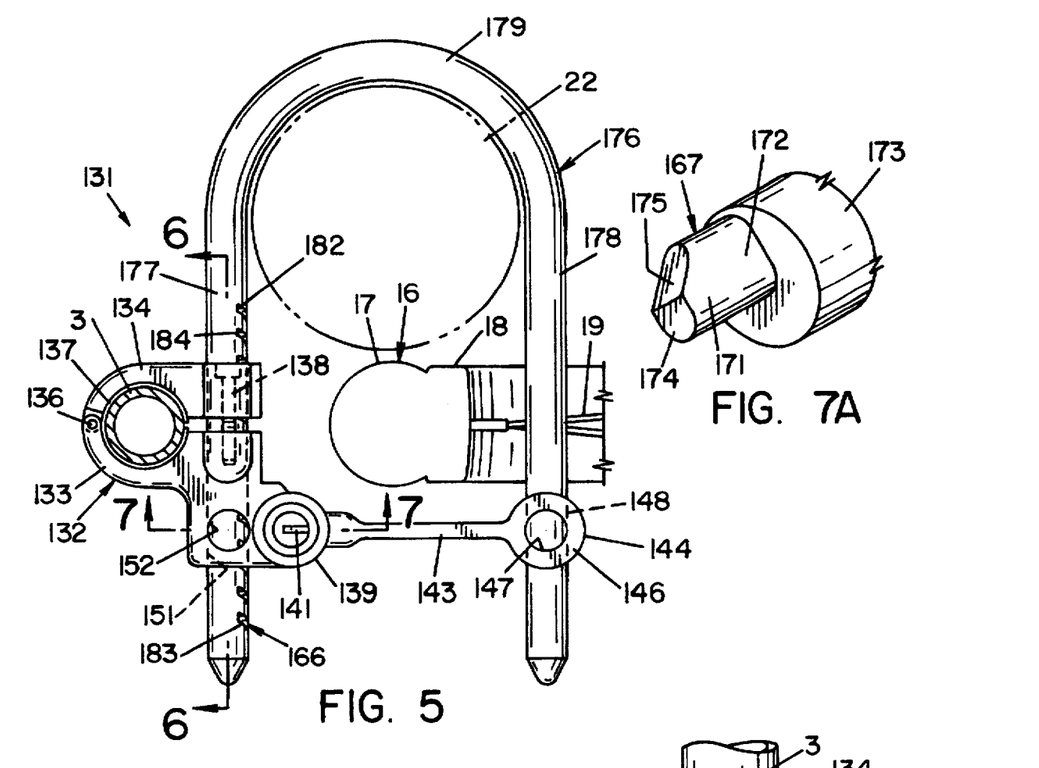
FIG. 5 is a plan view of another embodiment of the invention; showing the lock of FIGS. 2 and 3 with the shackle in the stored position.
FIG. 7A is an enlarged perspective view of the pawl of FIG. 7.
Figures 6, 7:
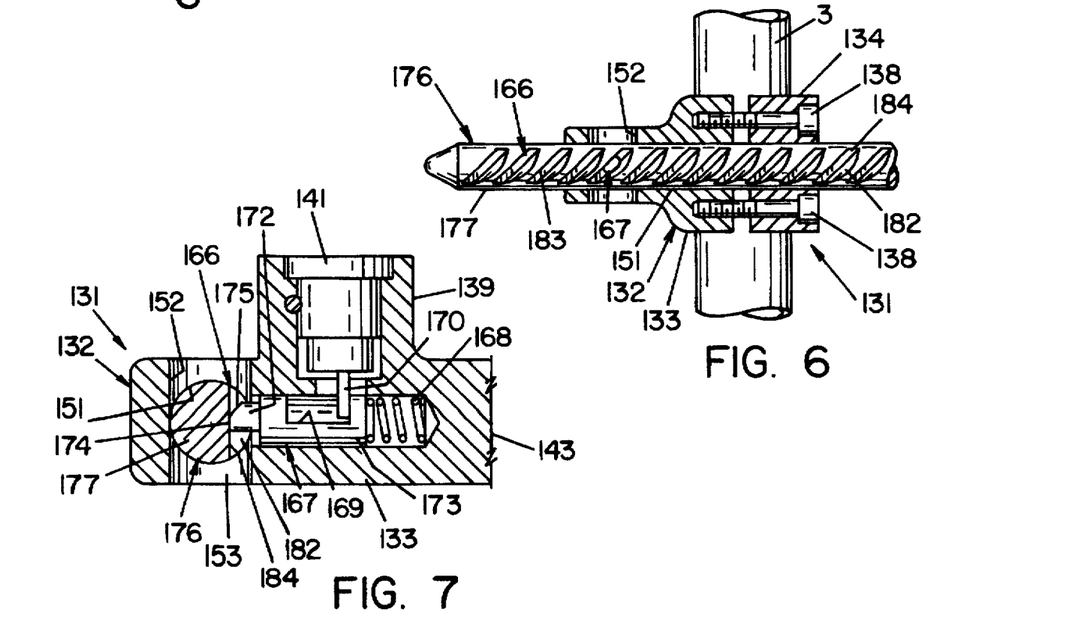
FIG. 6 is a cross-sectional view taken along lines 6—6 of FIG. 5.
FIG. 7 is a view, partially in cross-section, taken along lines 7—7 of FIG. 5.

The device 131 comprises a receiver 132 and a U-shaped shackle 176. The receiver comprises receiver body 133 secured to the seat tube 3 by clamp 134. The clamp is hinged at 136 to permit the same to be pivoted around and secured to the seat tube. A pad 137 between the clamp and the seat tube helps to ensure a tight, quiet, non-abrasive fit. Bolts 138 serve to secure the clamp to the body of the receiver, thereby preventing removal of the receiver from the bike frame. The receiver body 133 includes two holes or bores 151, 152, intersecting one another at right angles, forming a common opening 153. A spring biased pawl is key operated to extend into the common opening 153.

Extension arm 143 is offset from the axis of the seat tube 3 and extends rearwardly terminating in a free-end 144. The free end includes a storage tube 146 with hole 147 extending therethrough in an axial direction and hole 148 extending therethrough at right angles to hole 147. Shackle 176 comprises first arm 177 and second arm 178 joined together by a U-shaped bight 179. The second arm 178 engages hole 148 when the device is in the locked position and hole 147 for storage when the device is not in use. Key cylinder 141 is mounted in boss 139 secured to the receiver body 133.

Figure 8:
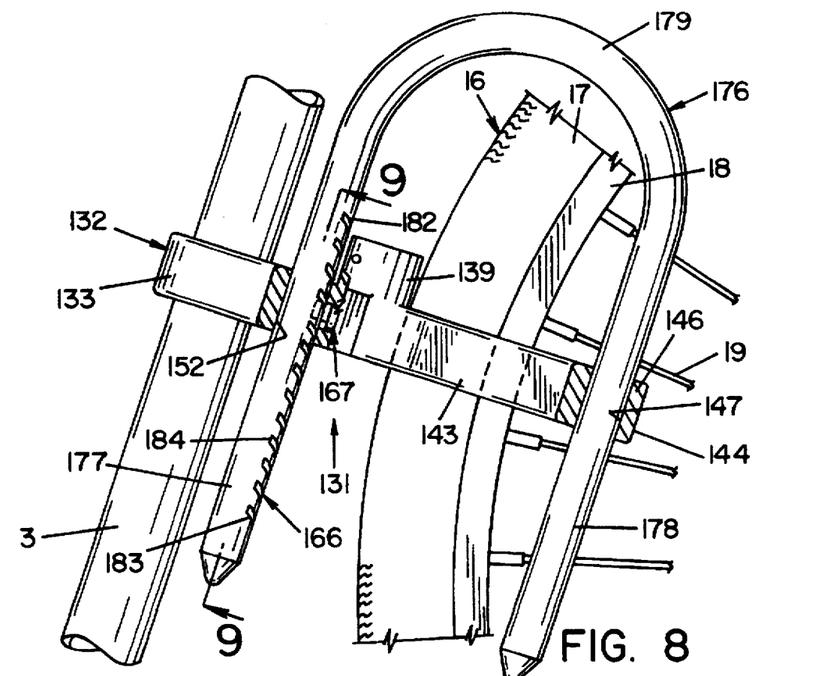
FIG. 8 is an elevational view of the embodiment of FIG. 5 with the shackle in the stored position.

FIG. 5 shows first arm 177 engaging lock hole 151 through the receiver body 133 and the second arm 178 engaging hole 148 at the end of the extension arm 143 whereby the lock serves to secure the bike frame and rear wheel 16 to object 22. FIG. 8 shows the first arm 177 engaging storage hole 152 in receiver 132 and the second arm 178 engaging hole 147 in tube 146 at the end of extension arm 143, for storage of the shackle when not in use.

Arm 177 of shackle 176 contains one set of ratchet teeth 166, evenly spaced along said arm, to lock the shackle within the receiver in either the stored or the secured position. The ratchet teeth 166 form an angle of 45° with respect to the axis of the arm. Each tooth comprises a radially extending abutment surface 183 and an angled bearing surface 182. A generally planar surface 184 typically forms the bottom of each tooth between the abutment surface and the bearing surface. Pawl 167 is biased by spring 168 into abutting contact with the teeth. The pawl contains a groove or slot 169. Torque blade 170 mounted in the lock extends into the groove. Upon rotation of the key in the lock, the torque blade rotates between a first position to withdraw the pawl from common opening 153 thereby permitting free movement of the arm and ratchet teeth in either direction and a second position permitting the pawl to extend into the passageway 151. With the pawl extending into the common opening 153 as shown in FIG. 7, telescoping movement of the arm into the receiver is permitted as the bearing surface 182 of each tooth 166 sequentially contacts the pawl 167 and forces the pawl out of the passageway against the spring 168. Withdrawal of the arm 177 from the receiver 132 is prevented when the pawl is in the passageway and the pawl stop surface 171 contacts the abutment surface 183 of the teeth.

The pawl is shaped to permit the operation of the shackle either while functioning as a security device or while stored in the receiver. With the ratchet teeth at an angle of 45° to the axis of the arm, the pawl contacts the tooth abutment surface at right angles thereto in either the locked or the stored position. This permits movement of the shackle into the receiver, but prevents removal of the shackle from the receiver.

Figures 9, 10:
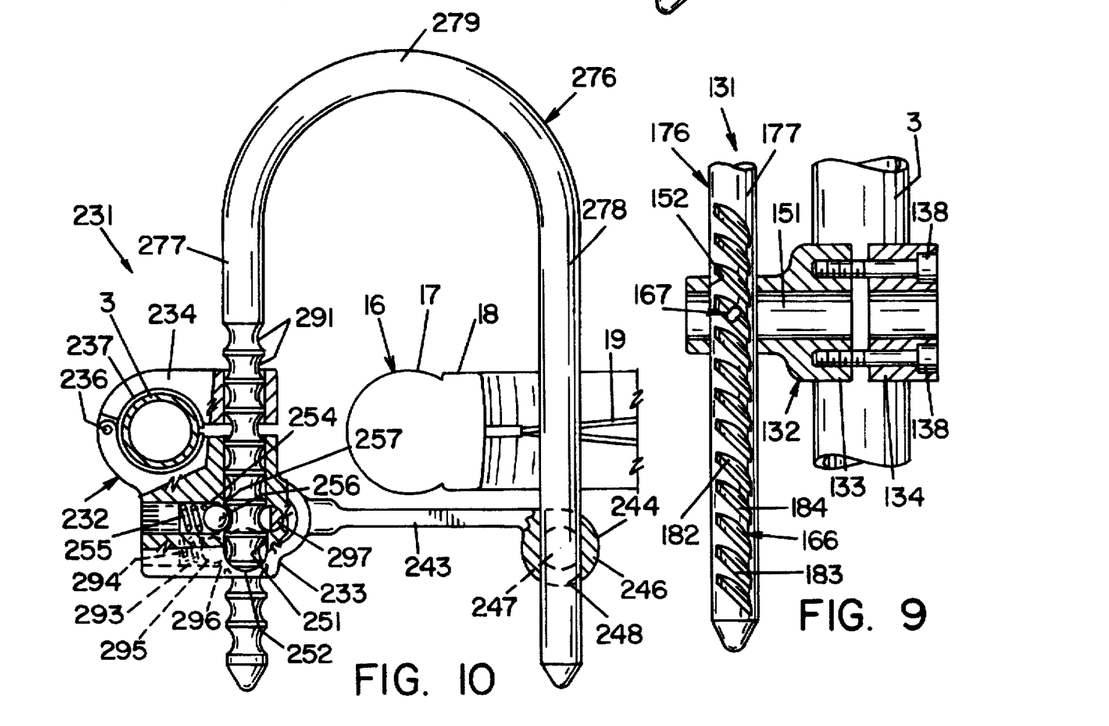
FIG. 9 is a view taken along lines 9—9 of FIG. 8.
FIG. 10 is a plan view of an embodiment using a shackle with semi-circular locking grooves.

As noted in FIG. 7A, the pawl is generally in the shape of an elliptical cylinder 172 projecting from a circular body 173 with the two elongated sides of the ellipse being generally planar. The elliptical surface 172 forms stop surface 171. The leading edge 174 of the pawl is generally U-shaped. It intersects bevelled surface 175. As the leading edge is spring biased into the space between adjacent ratchet teeth, a portion of the stop surface 171 contacts abutment surface 183 at right angles thereto. The contact between the stop surface and the abutment surface prevents removal of the ratchet from the receiver irrespective of whether the device is in the locked position (FIG. 6) or the stored position (FIG. 9). With the shackle in the stored position, the pawl is positioned with the major axis of the ellipse at right angles to the tooth surfaces. Surface 175 is bevelled at a 45° angle thereby providing clearance to permit the pawl to extend into the opening between adjacent teeth to prevent removal of the shackle. When, however, the shackle is in the locked position, the major elliptical axis of the pawl is parallel to the abutment and bearing surfaces, whereupon the pawl can readily introduced into the space between these surfaces without the benefit of bevel 175.

FIG. 10 shows a modification wherein the shackle contains semi-circular grooves instead of ratchet teeth, and the receiver is adapted to secure the shackle against movement in the locked position. The receiver 232 comprises receiver body 233 and offset extension arm 243. The receiver body comprises a clamp 234, a key lock of the type previously described, and a pair of blind holes, a first hole 254 and a second hole 293. The clamp is joined by hinge 236 to the body and serves to secure the receiver to seat tube 3, separated therefrom by cushioning material 237. The first blind hole 254 includes a spring 255 and a ball bearing 256 biased into passageway 251 through aperture 257. In like manner, the second blind hole 293 includes spring 294 and ball 295 projecting into passageway 252 through aperture 296.

Opposite the first ball is a semi-circular locking pin 297 activated by the key lock. The operation of the lock is the same as that described in U.S. Pat. No. 4,738,127, issued Apr. 19, 1988, the subject matter of which is incorporated herein.

The extension arm terminates in a free end 244. The free end comprises an annular sleeve 246, with axially extending hole 247, and a second hole 248 at right angles to the first hole. The shackle 276 comprises first arm 277 containing semi-circular grooves 291 evenly spaced along at least a portion of the length of said arm. Second arm 278 is parallel to and is connected to the first arm by U-shaped bight 279. The device is shown in the locked position with the first arm inserted into the lock hole 251 of receiver 232 and the second arm 278 inserted into hole 248. If, however, it is desired to store the shackle when not in use, the first arm of the shackle engages hole 252 and the second arm engages hole 247. The ball 295 in blind hole 293 is biased by spring 294 into contact with the grooves 291 to maintain the shackle within the receiver during storage.

Figure 11:
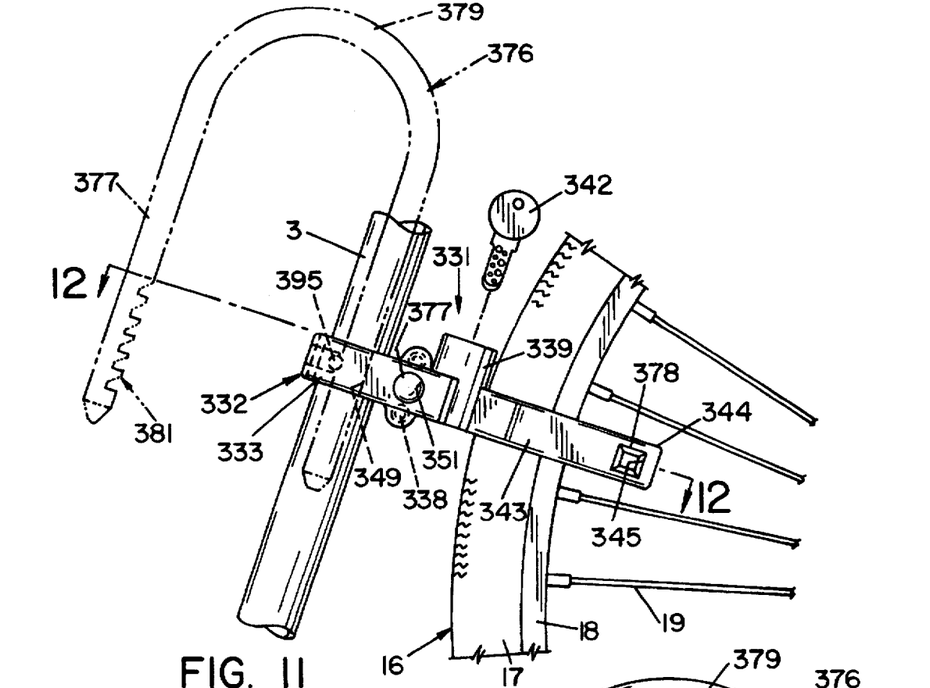
FIG. 11 is an elevational view of the security device showing a forward mounted storage placement for the shackle.
Figure 12:
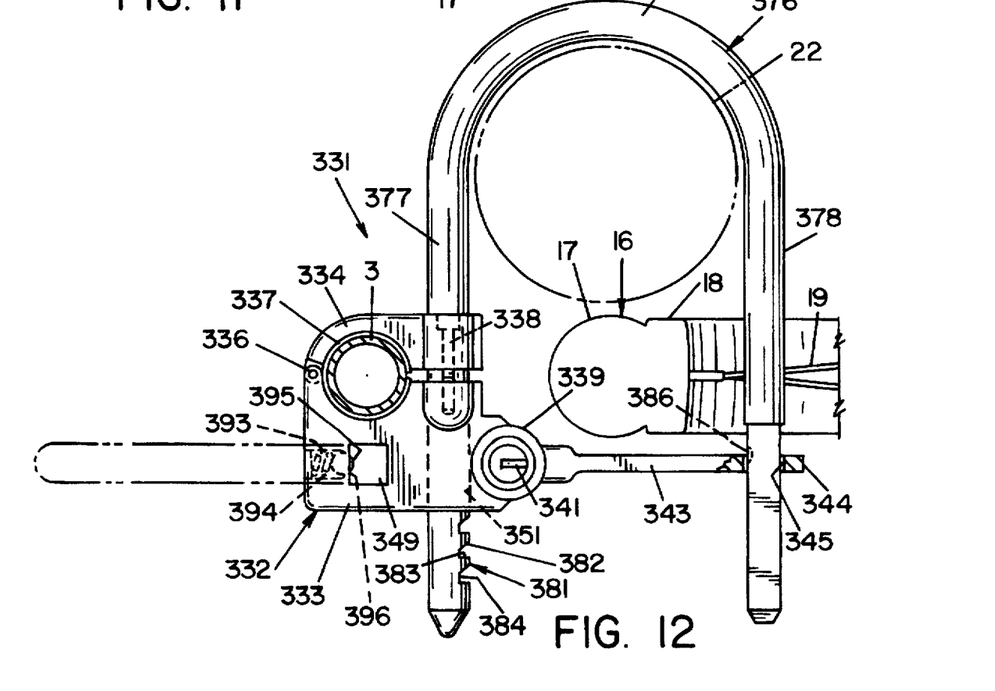
FIG. 12 is a view taken along line 12—12 of FIG. 11.

Turning now to FIGS. 11 and 12, the lock device is shown with an alternative storage arrangement. The device comprises a receiver 332 secured to seat tube 3 by clamp 334 pivotally joined to the receiver by hinge 336 and secured in place by bolts 338. The pad 337 functions in the manner previously described. The receiver includes offset extension arm 343 terminating in free end 344. The free end contains a square passageway 345 therethrough. The shackle 376 comprises first arm 377 containing ratchet teeth 381 spaced therealong, second arm 378 and U-shaped bight 379 joining the two arms. A plastisol coating covers much of the exposed surface of the shackle. The second arm 378 of the shackle contains a detent 386. The end of arm 378 is square in cross-section and is adapted to engage hole 345 when the device is in the locked position. As seen in FIG. 12, the device is used to join the frame of the bicycle and the wheel 16 to an immoveable object 22. The shackle operates in the manner previously described, with key lock 341 serving to move a spring biased pawl (not shown) into or out of contact with teeth 381. The receiver body 333 contains a storage hole 349 passing therethrough orthoganol to the direction of the lock hole 351. The storage hole 349 is square in cross-section and is adapted to receive the square portion of the second arm 378 of shackle 376. With said arm slipped into hole 349 during storage, detent 386 is engaged by bearing 395 extending through aperture 396 and biased into the detent by spring 394 in blind hole 393. In this modification, the shackle is held against rotation during storage by the square cross-sectional shape of the shackle arm and the storage hole and is held against axial movement within the storage hole by the ball actuated detent.

Figure 13:
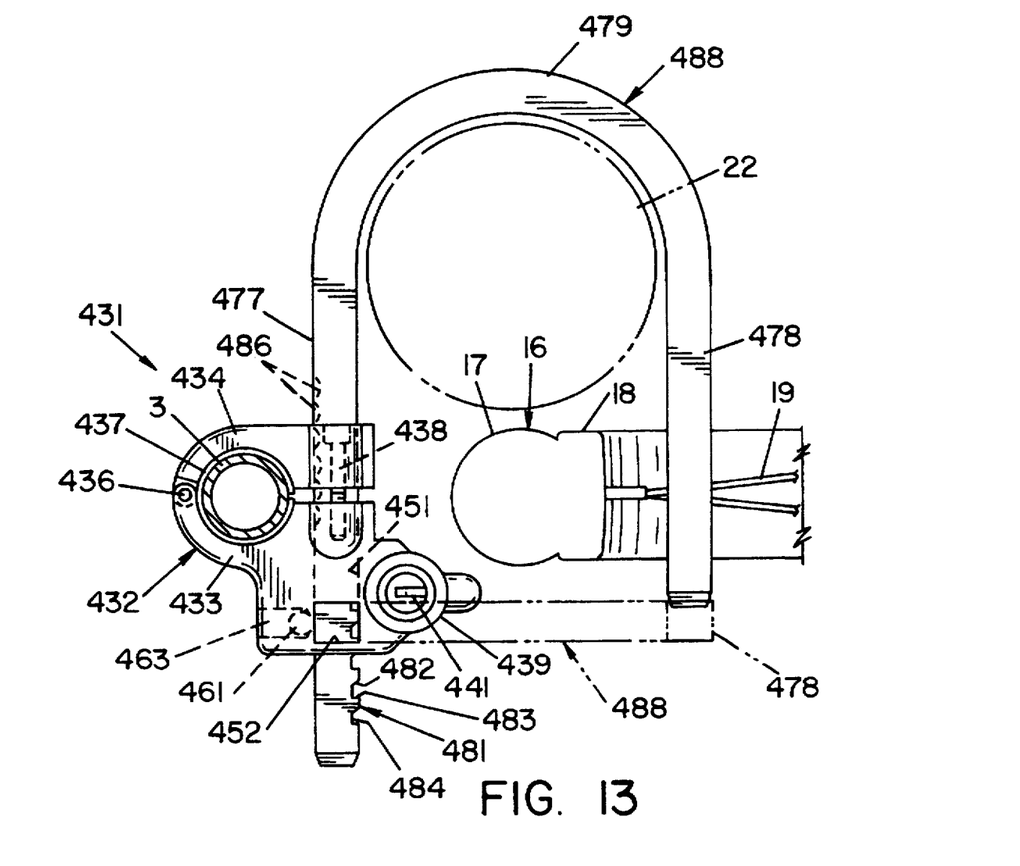
FIG. 13 is a fragmentary plan view showing an embodiment with a J-shaped storable shackle having a square profile.
Figures 14, 15:
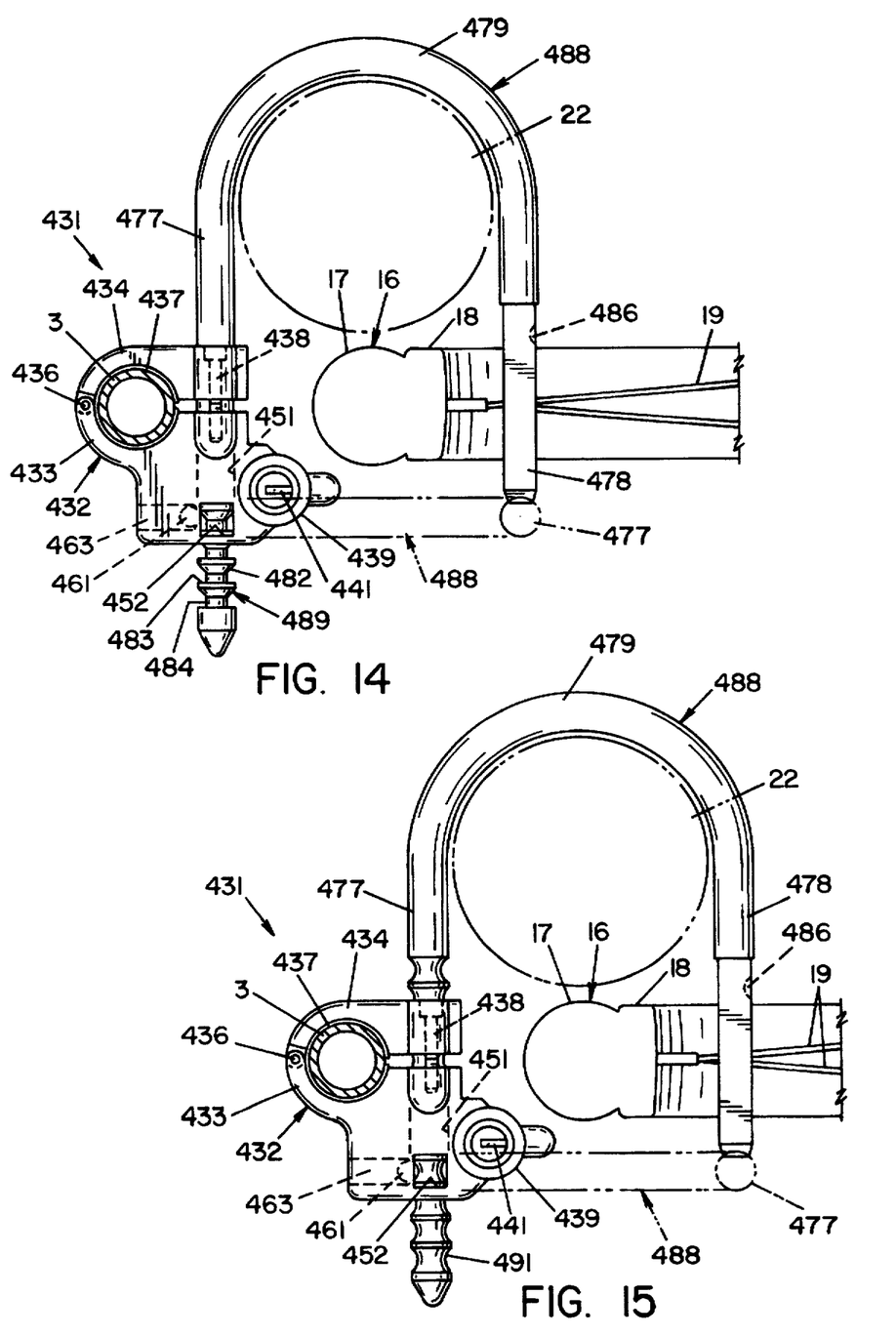
FIG. 14 is a fragmentary plan sectional view of the device showing a J-shaped storable shackle having fully circumscribing ratchet teeth and a square profile for the storage arm.
FIG. 15 is a view similar to FIG. 14 with a J-shaped storable shackle having semicircular grooves encircling one arm thereof.

Instead of engaging the receiver with both ends of the shackle when securing a bicycle to a fixed object, an alternative arrangement utilizes a J-shaped shackle with one arm engaging the receiver, and the other arm remaining unattached. This device is shown in FIGS. 13–15. The device comprises a receiver 432 and a shackle 488. The receiver is adapted to be secured by clamp 434 and bolt to seat tube 3. A key lock 441 integral with the receiver is used to secure the shackle from removal. The shackle comprises a first arm 477 and second arm 478 connected by bight 479. Preferably, but not necessarily, the first arm 477 is longer than the second arm 478, giving the shackle 488 a J-shaped configuration.

In operation, the bicycle is placed near an immoveable object 22 and the shackle is placed around the object with the first arm engaging lock hole 451 and the second arm passing through the spokes 19 of wheel 16. First arm is provided with ratchet teeth 481 evenly spaced along the axis of the arm, arranged along at least one face partially or completely circumscribing the same. Instead of ratchet teeth, semi-circular grooves 491 can be used. Whichever lock engaging means is used, a suitable locking device is employed to prevent removal of the shackle arm from the receiver. Referring specifically to FIG. 13, the shackle 488 is square in cross-section, being formed, for example, from square bar stock. The first shackle arm 477 contains a plurality of ratchet teeth 481 arranged along the inside planar surface. These teeth may extend at right angles to the axis of the arm, or as shown in FIGS. 5–9, can be arranged at a 45° angle along the arm. A square storage hole 452 extends through the receiver, and a ball 461 in blind hole 463 is spring biased into the storage hole. A plurality of dimples on the outer surface of arm 477 form detents 486 to engage the ball 461 thereby holding the shackle in position during storage.

FIG. 14 shows a J-shackle 488 with a plurality of ratchet teeth 489 arranged along the first arm 477 which is circular in cross-section as is bight 479. The second arm 478 has a square cross-section and a single detent 486. During storage, the second arm is inserted into storage hole 452 until the spring biased ball 461 in blind hole 463 engages detent 486.

FIG. 15 shows storage features similar to those shown in FIG. 14. Instead of using a ratchet arrangement for locking, as in FIG. 14, a series of semi-circular locking grooves 491 are used. The details of operation of this locking mechanisms is the same as that previously described in connection with the embodiment shown in FIG. 10.

Figure 16:
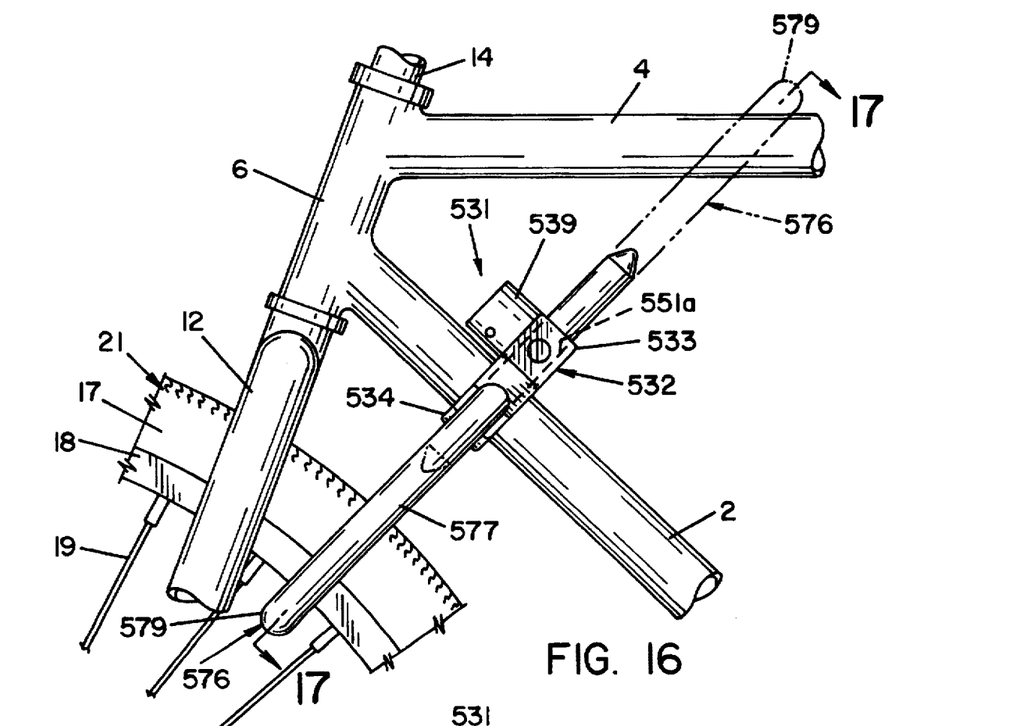
FIG. 16 is an elevational view showing the self-storing lock device for securing the front wheel of a bicycle to the frame thereof; and, FIG. 17 is a top view taken along lines 17—17 of FIG. 16.
Figure 17:
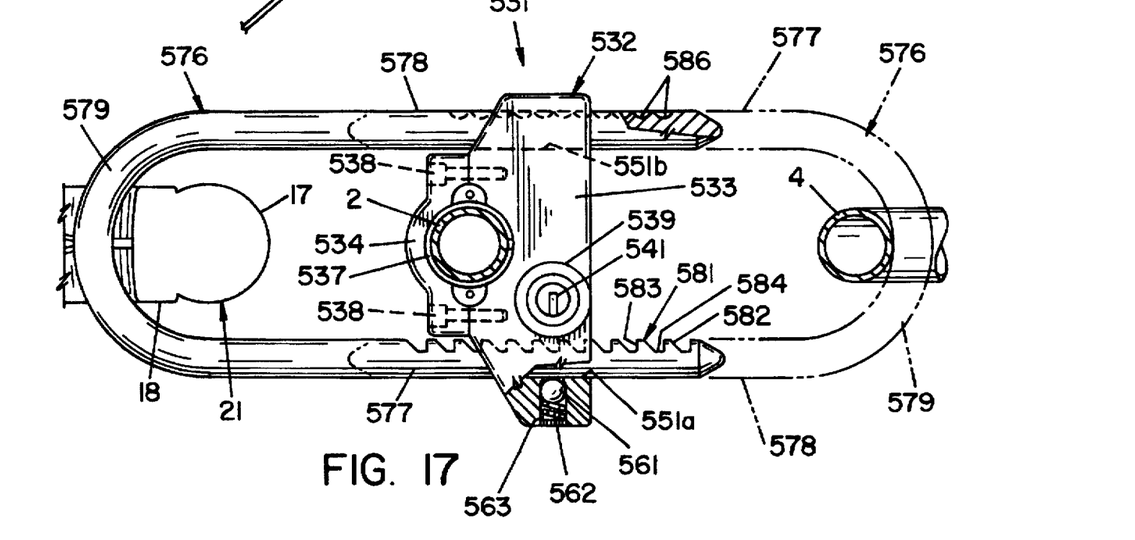

FIGS. 1B, 16 and 17 show a modification of the lock of the present invention adapted for use in securing the front wheel of the bicycle to the bicycle frame. This is of particular importance on those bicycles equipped with quick release wheel locks. The temptation for theft afforded by these locking devices makes the front wheels a ready target when the bike is parked. This modified self-storing lock secures the wheel of the bike to the bicycle frame to prevent such theft. In pertinent portion, the bicycle frame comprises top tube 4 joined to down tube 2 at head tube 6. Extending from head tube is front fork 12. These forks include dropouts (not shown) into which the wheel 21 including rim 18 and tire 17 are secured. The security device comprises receiver 532 containing first and second parallel holes 551a, 551b. U-shaped shackle 576 includes first shackle arm 577, second shackle arm 578 and bight 579. The two shackle arms are parallel to one another. Ratchet teeth 581 are evenly spaced along at least a portion of the length of the first shackle arm and may be machined or otherwise formed along one surface of the shackle or may totally or partially circumscribe the arm as appropriate. The second arm 578 contains a plurality of detents 586 spaced therealong. In use, the shackle 576 is passed around the rim and tire of the front wheel 21 with the two arms of the shackle being inserted into the receiver where the key lock 541 serves to secure the shackle against removal. The device is dimensioned to permit the shackle to contact and be secured to the receiver without damage to the shifting and braking mechanism and cables.

In the stored position, the shackle 576, typically covered with a plastisol coating, is passed over top tube 4 and the arms are again inserted into the holes in the receiver, with second arm 578 engaging lock hole 551a in receiver 532. Blind hole 563 in the receiver contains spring 562 which biases a metal ball 561 through an aperture into contact with the detents 586 on the outside surface of arm 578. This permits the shackle to be readily stored within the receiver when not in use.

Although the invention has been described with respect to certain specific embodiments as exemplified by the drawings and the description, it is understood that other embodiments are likewise included within the present invention, the scope of which is delimited and defined by the claims.

Having thus described the invention, it is claimed:

1. A bicycle locking and storage device mountable on a bicycle frame member in proximity to the rim and tire of a wheel of said bicycle, said frame member having an axis and said rim and tire having laterally opposite sides with respect to said axis, said device comprising a receiver having a body portion mounted on said frame member and an arm extending from said body portion laterally outwardly of one of said opposite sides of said rim and tire and having an outer end spaced from said body portion for said rim and tire to be between said outer end and said body portion, a U-shaped shackle having first and second parallel legs joined by a bight, said body portion and said outer end of said arm respectively having first and second openings therein for respectively receiving said first and second legs of said shackle in a locking position of said shackle in which said first and second legs receive said rim and tire therebetween and extend transverse to said axis for said bight to be on the other of said opposite sides of said rim and tire, said body portion including lock means interengaging with said first leg to releasably lock said shackle in said locking position, and said receiver and said shackle including means interengaging for said receiver to support said shackle in a storage position of said shackle in which said first and second legs of said shackle are in a plane parallel to said axis of said frame member.

2. The device according to claim 1, wherein said means interengaging said receiver and said shackle includes third and fourth openings respectively in said body portion and said outer end of said arm for respectively receiving one and the other of said first and second legs of said shackle.

3. The device according to claim 1, wherein said means interengaging said receiver and said shackle includes a hole in said body portion for receiving one of said first and second legs of said shackle and having an axis parallel to said axis of said frame member, and means interengaging said hole and said one leg against rotation of said one leg about the axis of said hole.

4. The device according to claim 3, wherein said hole and said one leg have mating non-circular contours providing said means interengaging said hole and said one leg against rotation of said one leg.

5. The device according to claim 4, wherein said hole is square and said one leg of the shackle is square in cross section.

6. The device according to claim 3, wherein said hole in said body portion contains a spring biased bearing and said one leg includes a recess engaged by the bearing to arrest axial movement of the shackle in the storage position.

7. The device according to claim 1, wherein said second opening in said arm is square and said second leg of said shackle includes a square end portion sized to be inserted into and withdrawn from said second opening.

8. The device according to claim 7, wherein said means interengaging said receiver and said shackle includes a square hole in said body portion for receiving the square end portion of said second leg.

9. The device according to claim 8, wherein the square hole in said body portion contains a spring biased bearing and the square end portion of the second leg includes a recess engaged by the bearing to arrest axial movement of the shackle in the storage position.

10. The device according to claim 1, wherein said first leg includes lock engaging ratchet teeth evenly spaced along a portion thereof, and said lock means includes a spring biased pawl for engaging said ratchet teeth.

11. The device according to claim 10, wherein the ratchet teeth and the pawl cooperate to permit insertion of said first leg into said first opening and to prevent withdrawal of said first leg from the lock means when said shackle is in said locking position.

12. The device according to claim 10, wherein the ratchet teeth form an angle of 45° with respect to the axis of said first shackle leg, each tooth comprising an abutment surface and a bearing surface, said pawl, when engaging said abutment surface, preventing separation of the first shackle leg from the body portion in both the locking position and the storage position.

13. The device according to claim 12, wherein the cross-sectional shape of the pawl is elliptical with the major axis of the ellipse forming a 45° angle with respect to the axis of the first shackle leg when the first shackle leg engages the body portion in the locking position and in the storage position.

14. The device according to claim 1, wherein said first leg includes semicircular grooves evenly spaced along a portion thereof, and said lock means includes a lock pin adapted to rotate into and out of engagement with the grooves to respectively prevent and permit movement of said first leg into and out of said first opening.

* * * * *